Figure 1:
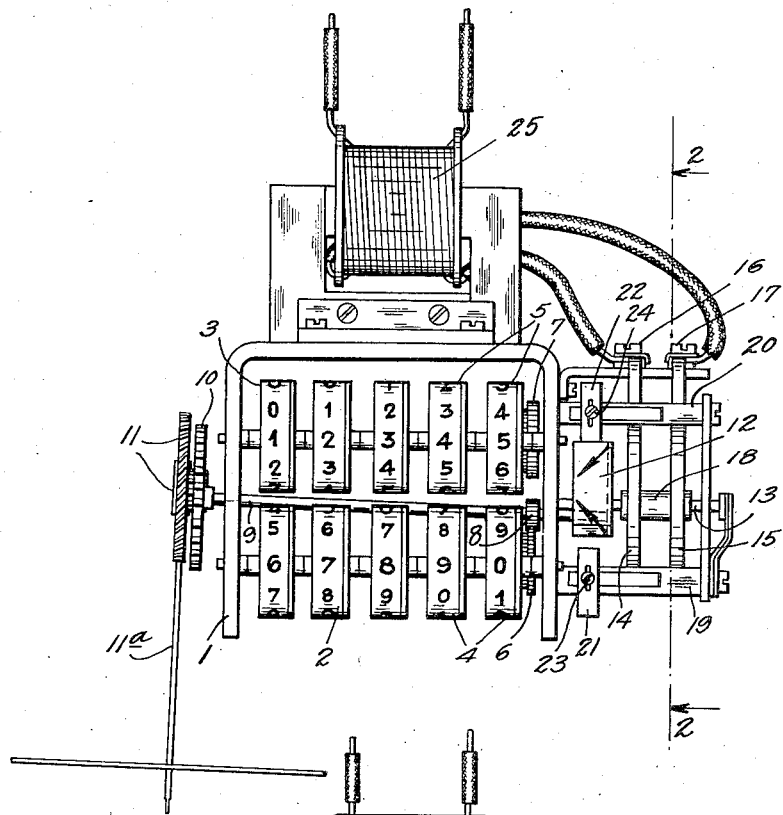

April 14, 1936.    J. WENK    2,037,447
MULTIPLE RATE METER
Filed June 18, 1930

Patented Apr. 14, 1936

2,037,447

UNITED STATES PATENT OFFICE 2,037,447

MULTIPLE RATE METER

Juan Wenk, Madrid, Spain, assignor to Landis & Gyr, A.-G., Zug, Switzerland, a corporation of Switzerland Application June 18, 1930, Serial No. 462,059
In Switzerland June 27, 1929

1 Claim. (Cl. 171—34)

The present invention relates to means for controlling driving mechanism and more particularly to means for controlling the registration of multiple-rate electricity meters.

Objects and advantages of the invention will be set forth in part hereinafter and in part will be obvious herefrom, or may be learned by practice with the invention, the same being realized and attained by means of the instrumentalities and combinations pointed out in the appended claim.

The invention consists in the novel parts, constructions, arrangements, combinations and improvements herein shown and described.

The accompanying drawing, referred to herein and constituting a part hereof, illustrates one embodiment of the invention, and together with the description, serves to explain the principles of the invention.

Figure 2:
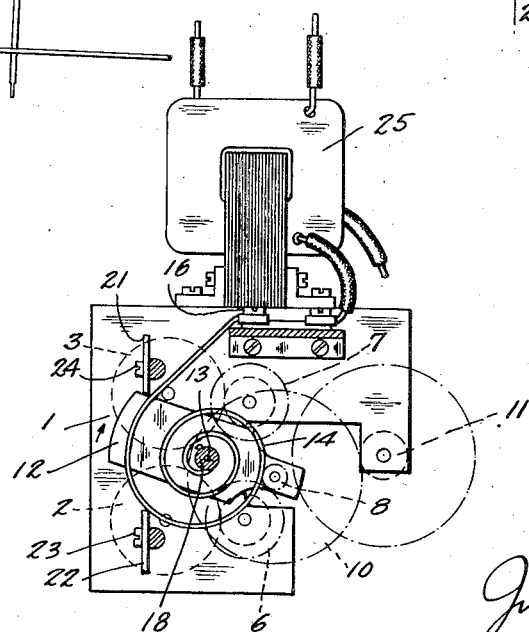

Of the drawing:

Fig. 1 is a front elevation of the present preferred and illustrative embodiment of the invention; and Fig. 2 is a section taken on the line 2—2 of Fig. 1.

The present invention has for its object the provision of a compact multiple-rate meter having a low energy consumption and which is noiseless in operation, is easily and quickly adjusted and in which the mechanism for changing the rate of registration does not set up magnetic interference to influence the operation of the meter. The invention has for a further object the provision of a multiple-rate meter which can be manufactured and operated more economically than the previously known multiple-rate meters. The invention also provides a multiple rate meter of exceptional reliability and simplicity of construction.

In accordance with the present invention, the multiple rate electricity meter includes the usual watt-hour meter, a multiple-rate registering mechanism driven by the meter and means for changing the rate at which the energy is registered. In the preferred embodiment of the invention, the registering mechanism includes a plurality of counting trains, all of which are arranged to be selectively driven by the metering mechanism. The mechanism which controls the registration and determines which one of the counting trains is to be driven includes a thermally responsive member, such as bi-metal strips normally maintaining one counting train in driving relation with the meter, but adapted to be heated to disconnect the normally-driven counting train from the meter and to connect another counting train to be driven from the meter. For alternating current use, the thermally-responsive member is preferably electrically heated by energy supplied from a small transformer and controlled by clock mechanism or a load current relay, but may be indirectly heated.

It will be understood that the foregoing general description and the following detailed description as well, are exemplary and explanatory of the invention but are not restrictive thereon.

Referring now in detail to the present embodiment of the invention as illustrated in the accompanying drawing, the registering mechanism comprises a frame 1 on which are mounted two counting trains 2, 3 of conventional construction having the unit drums 4, 5 in driving engagement with the gears 6, 7. Between the gears 6 and 7 is arranged a driving pinion 8 fastened to a movable shaft 9 carrying gear 10 which is connected through gearing 11 with the usual worm on the meter disc spindle 11a of the metering mechanism. Shaft 9 at one end is mounted in the frame and at its other end is journaled in the oscillatable lever 12 which lever is pivotally mounted by means of shaft 13.

The thermally responsive means for changing the rate of registration preferably comprises two bi-metallic springs 14, 15, the outer ends of which are securely fastened to terminals 16, 17 while the inner ends are secured to the metal sleeve 18 fixed on shaft 13 by means of a set screw, pin, or the like. As shown in the drawing the springs 14, 15 arranged in series, form a simple connection between the terminals 16, 17 and receive the current supplied to the terminals. Terminals 16, 17 are connected, in the preferred embodiment which is adapted for alternating current with the secondary of a small transformer 25 which supplies the springs 14, 15 with the heating current at a low voltage.

For limiting the movement of the lever 12, stops 21, 22 are provided which are secured to the pillars 19, 20 by screws 23, 24.

As shown in the drawing, the bi-metallic arrangement is in its cold condition. The change over pinion 8 is then in engagement with the gear 6. When the controlling current circuit is closed by means of a time switch or of a load current relay, the bi-metallic springs are heated and after a definite time of heating, by reason of suitable composition of the materials, the bi-metallic springs will contract in such a manner that the oscillatable lever 12 is turned in the direction indicated by the arrow. By this means the change over pinion 8 comes out of engagement with the gear 6 and into engagement with the gear 7. By the change over the lower counting train drums 2 will come to rest and the upper counting train 3 be set in operation by the meter. As soon as the controlling current circuit is interrupted, the bi-metallic spiral springs 14, 15 will cool down again, so that by the change over of the pinion 8 caused thereby the said pinion will be again coupled to the gear 7 of the lower counting train 2.

The invention in its broader aspects is not limited to the specific mechanisms shown and described but departures may be made therefrom within the scope of the accompanying claim, without departing from the principles of the invention and without sacrificing its chief advantages.

What I claim is:—

In a multiple rate meter a plurality of counting trains, a meter disc for alternatively driving one of said counting trains, shiftable gearing connecting said disc and trains including a shiftable pinion mounted in a pivoted support, a pair of bimetal spiral springs connected to rock said support and move the pinion into engagement with one or the other of the trains, terminals connected to the outer ends of the bimetal springs and means for electrically connecting the inner ends of the bimetal springs whereby current supplied to the terminals will cause shifting of the pinion.

JUAN WENK.